Feb. 26, 1952 J. G. POLK 2,587,214
MACHINE FOR THE MANUFACTURE OF SPANGLES
AND SIMILAR ARTICLES
Filed Sept. 6, 1947 5 Sheets-Sheet 1

INVENTOR.
Joseph G. Polk
BY
Norman R. Holland
ATTORNEY

Feb. 26, 1952     J. G. POLK     2,587,214
MACHINE FOR THE MANUFACTURE OF SPANGLES
AND SIMILAR ARTICLES
Filed Sept. 6, 1947     5 Sheets-Sheet 2
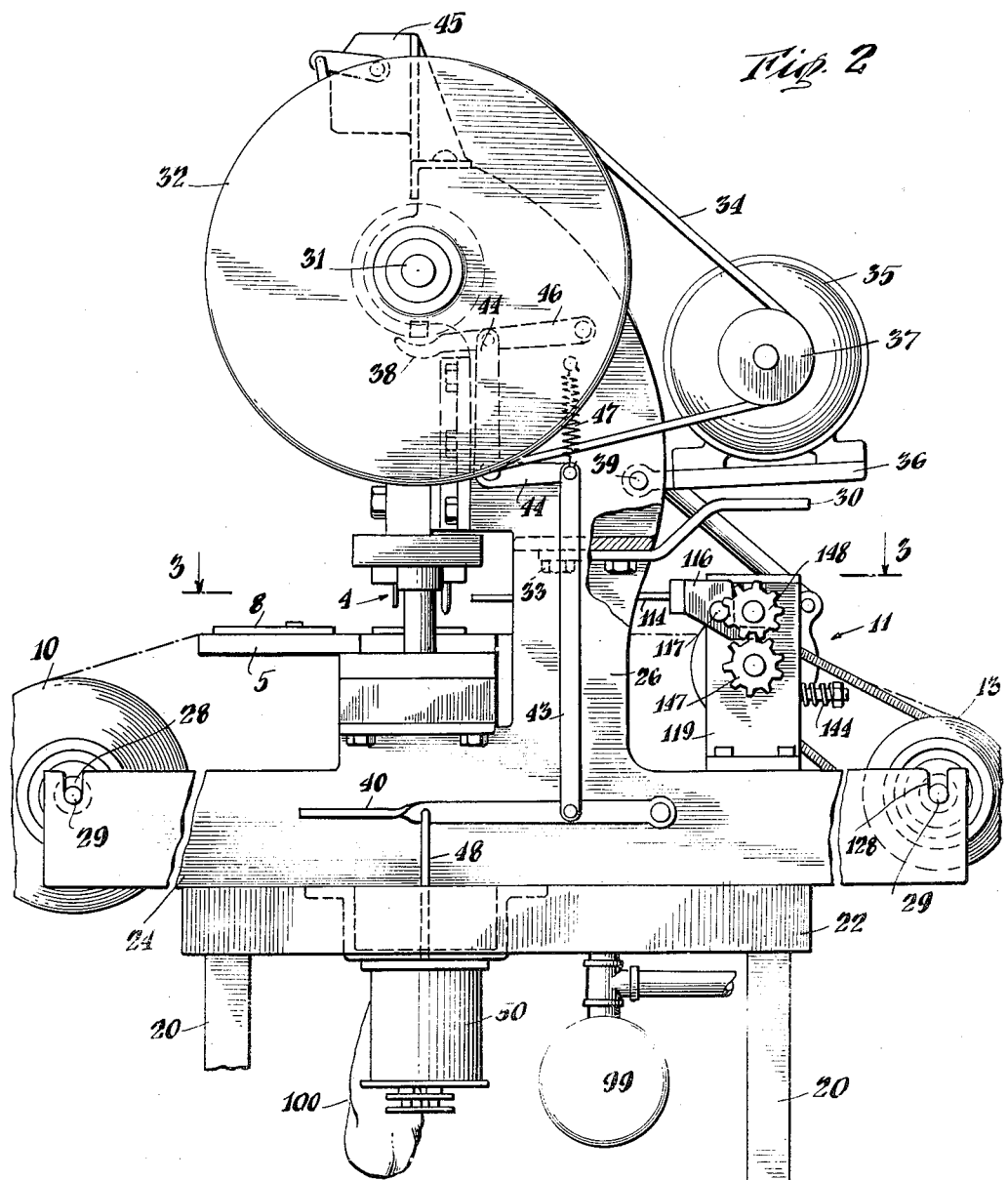
Fig. 2
Fig. 10
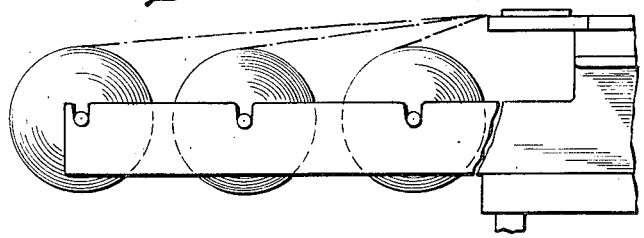
INVENTOR.
Joseph G. Polk
BY
ATTORNEY

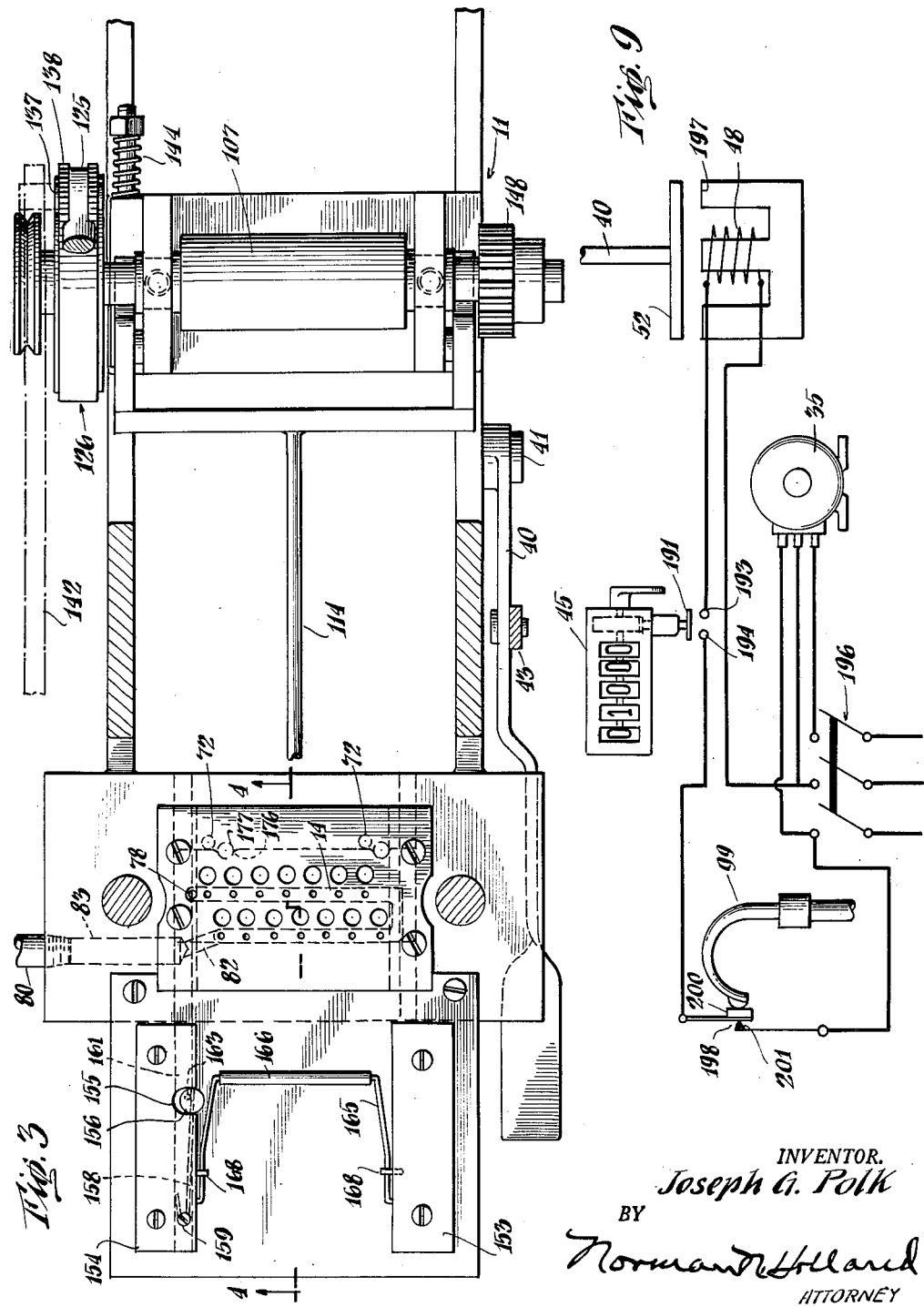

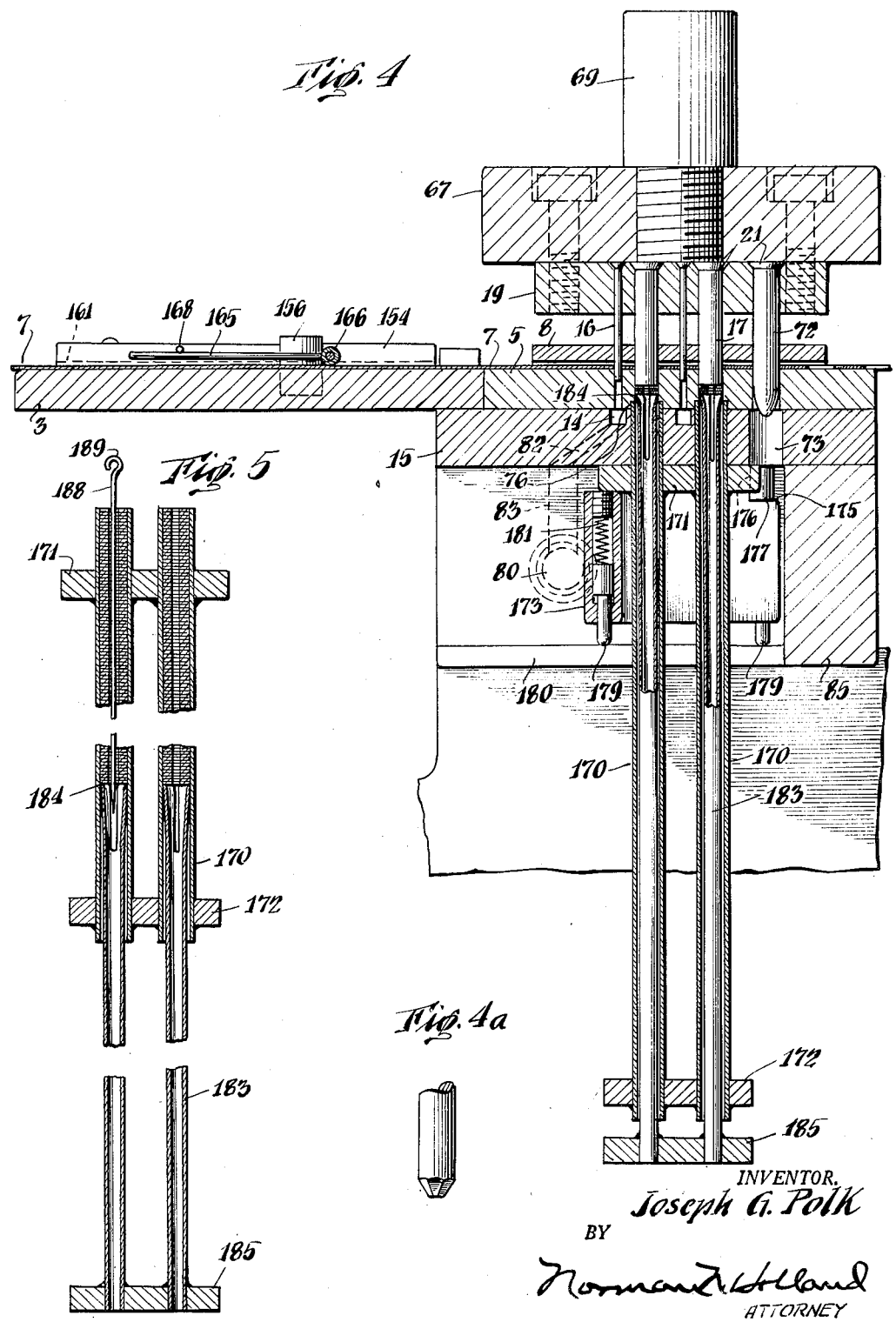

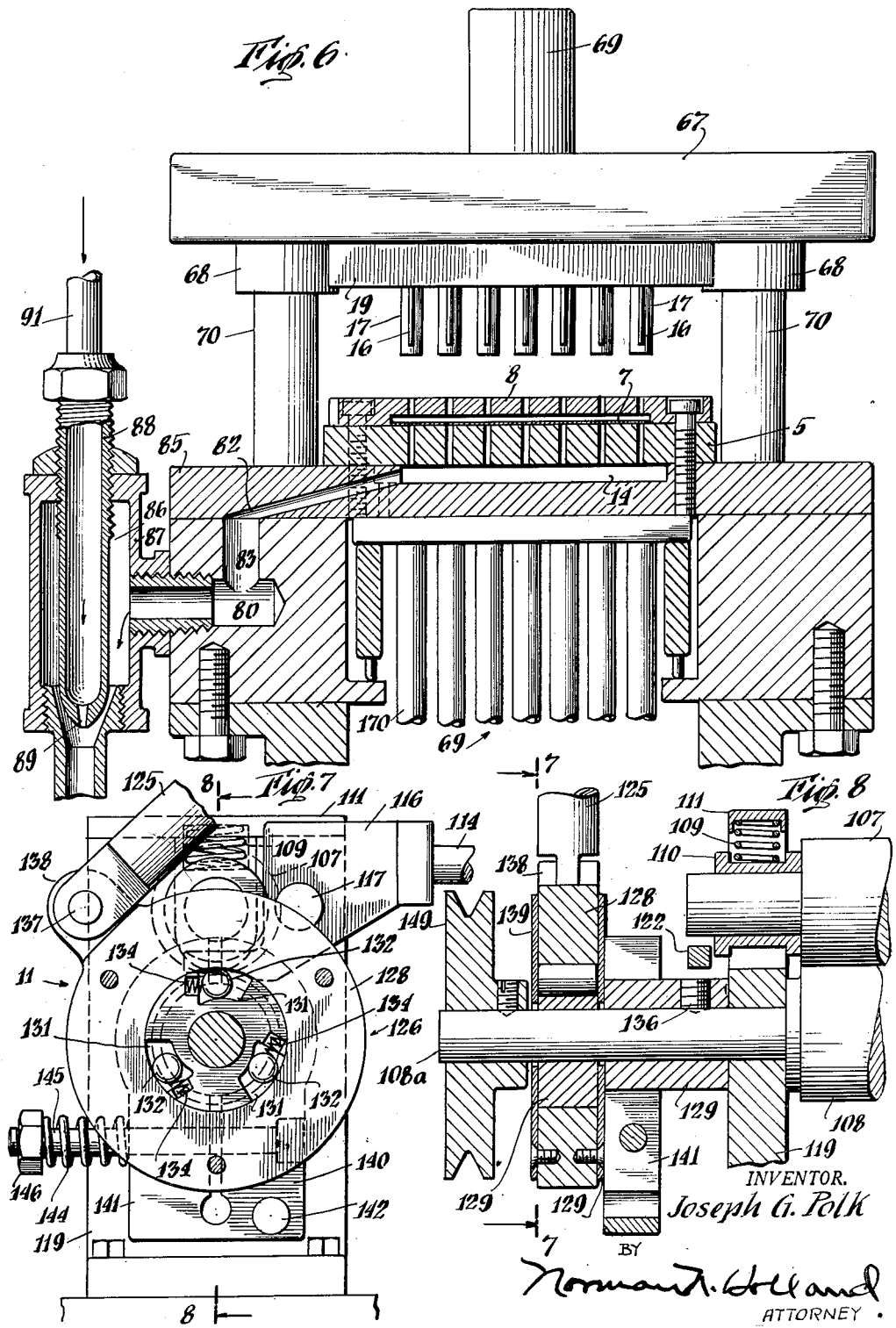

Patented Feb. 26, 1952

2,587,214

UNITED STATES PATENT OFFICE 2,587,214

MACHINE FOR THE MANUFACTURE OF SPANGLES AND SIMILAR ARTICLES

Joseph G. Polk, Freeport, N. Y.; Helen R. Polk administratrix of said Joseph G. Polk, deceased Application September 6, 1947, Serial No. 772,499

7 Claims. (Cl. 164—13)

1

The present invention relates generally to a punch press and more particularly to a new and improved punch press adapted to be utilized for the manufacture of articles known as "spangles."

A spangle (Fig. 1a) generally comprises a small plate-like or disc-like member made of shiny material which may be stitched in any suitable designs to ladies' dresses, pocket-books, et cetera, to provide an enhanced decorative effect. As shown in Fig. 1a a spangle may comprise a disc-like member 1 of thin material having a relatively small opening or hole 2 through the approximate center thereof. The present machine will be described chiefly with reference to the manufacture of spangles of this type.

While any suitable material may be utilized for the spangles, various synthetic plastic materials have proven satisfactory; these kinds of materials are shiny and may be made in various colors or shades. Such materials may be formed in relatively thin sheets or strips which are readily perforated in formation of the spangles.

In order to make feasible the use of such spangles for providing decorative effects it is desirable that they be produced in relatively large quantities to reduce the cost of manufacture. In addition to being producible in large quantities it is also most desirable that the spangles be manufactured by automatically operating machines which require a minimum amount of supervision or maintenance. The present invention contemplates the provision of a machine which may be utilized for manufacturing spangles in relatively large quantities and with a minimum amount of supervision on the part of an operator, the operator being used mainly to insert magazines or spangle receiving means, to remove filled magazines or receivers from the machine, and to generally oversee the correct functioning of numerous machines.

An object of the present invention is to provide a new and improved punch press.

Another object of the invention is to provide a new and improved punch press particularly adapted for use in the manufacture of spangles.

Another object of the invention is to provide new and improved means for removing waste material from a machine.

A further object of the invention is to provide a new and improved device or magazine for containing formed spangles.

A further object of the invention is to provide a new and improved means for automatically controlling the operation of a machine,

2

A further object of the invention is to provide improved means for automatically stopping the operation of the machine upon the machine reaching a predetermined condition.

Other and further objects of the invention will be obvious upon an understanding of the illustrative embodiment about to be described or will be indicated in the appended claims, and various changes not referred to herein will occur to one skilled in the art upon employment of the invention in practice.

A preferred embodiment of the invention has been chosen for purposes of illustration and description and is shown in the accompanying drawings, forming a part of the specification wherein:

Fig. 1a is a view of a spangle adapted to be made by the present machine;

Fig. 2 is an elevational view showing the opposite side of the machine from that illustrated in Fig. 1;

Fig. 3 is a sectional view taken along the line 3—3 of Fig. 2;

Fig. 4 is a sectional view taken along the line 4—4 of Fig. 3;

Fig. 4a is a view showing a modified form of punch;

Fig. 5 is a sectional view showing a preferred form of magazine or receiving mechanism;

Fig. 6 is a sectional view taken along the line 6—6 of Fig. 1;

Fig. 7 is a fragmentary view showing a preferred form of feeding or advancing means taken along the line 7—7 of Fig. 8;

Fig. 8 is a sectional view taken along the line 8—8 of Fig. 7;

Fig. 9 is a diagrammatic view showing a preferred form of automatic control means; and Fig. 10 is a fragmentary view illustrating the feeding of a plurality of lengths of material through the machine.

Figure 1:
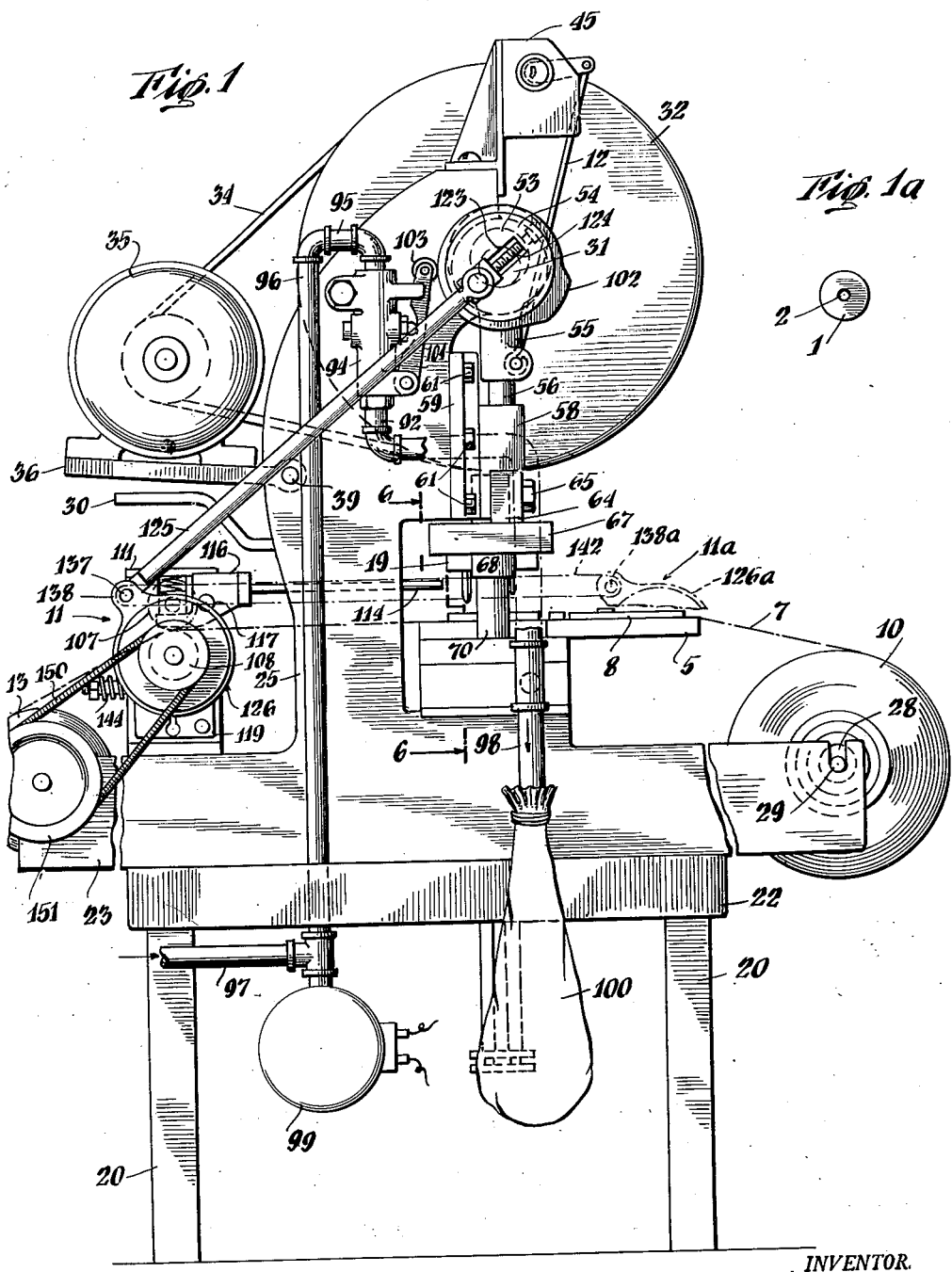
Fig. 1 is a side elevational view of a preferred embodiment of the present machine.

Described generally, the machine comprises reciprocable punch means 4 which co-operates with a die plate 5 to form perforations or openings in lengths of material 7 passing over the die plate 5 and beneath a stripper plate 8. The length of material may be in the form of a roll 10 mounted adjacent the inlet end of the machine, the roll being fed through the machine by a feeding mechanism 11 and rewound into a second roll 13 at the outlet or discharge side of the machine.

The small pieces of material removed to form a center opening 2 of a spangle (Fig. 1a) are received by recesses or channels 14 in a bottom plate 15 and may be removed therefrom by means which will be hereinafter described. It will be noted, particularly in Fig. 4, that the small center openings are formed by punches 16 of relatively small diameter The exterior shape of the spangle 1 is shown formed by punches 17 of larger diameter than the center punches 16 both sizes of punches reciprocating together. The punches 16 and 17 are shown carried by a punch plate 19. Each time the punch plate 19 descends with the punches 16 and 17 the smaller punches 16 provide the small openings 2 for a spangle and the larger punches 17 "knock out" or punch a spangle 1 from the length of material 7 located above the die plate 5. Upon the up stroke of the punches, the feeding or advancing mechanism 11 (Fig. 1) serves to move the length of material 7 forwardly through the machine by an amount sufficient to place a succeeding unperforated area of material beneath the punches. The advancing means 11 is constructed and operates to move the length of material 7 through the machine a predetermined distance so that center perforations formed by the smaller punches 16 will be positioned approximately beneath the centers of the larger punches 17; in this manner each of the spangles formed by the larger punches 17 will be provided with a centrally disposed opening 2 for use in attaching spangles to an article.

As shown in Figs. 1 and 2 the machine may be mounted upon a table or frame comprised of upright or leg portions 20 and a suitable mounting platform or base 22. A pair of spaced horizontally extending members 23 and 24 may be bolted or otherwise secured to the platform 22 and to these later spaced members 23 and 24 may be suitably secured spaced upwardly extending side members 25 and 26. The ends of the spaced horizontal side members 23 and 24 may be provided with suitable cut-outs or notches 28 adjacent the ends thereof for receiving the axles or supporting members 29 which serve to carry the rolls 10 and 13 of unperforated and perforated material. The feeding of the material through the machine from one row to the other will be hereinafter brought out in greater detail.

The spaced uprights 25 and 26 serve to support, in suitable bearings adjacent the upper portions thereof, a horizontally extending crank shaft 31, the crank shaft being connected adjacent one end thereof in any suitable and known manner with a fly wheel 32. The fly wheel 32 is preferably provided with a suitable groove or recess around its periphery forming a seat or channel for a drive belt 34 connected with an electric motor 35 through the intermediation of pulley 37. The motor 35 may be connected with an electricity supply line so that when energized it will rotate the pulley 37 and cause the belt 34 to rotate the fly wheel 32.

The motor 35 is shown preferably mounted on a platform or base 36, which is in turn pivotally mounted adjacent one end thereof on the spaced uprights 25 and 26 by a pin 39. By this construction the weight of the motor and its base serves to maintain a constant pull on the belt 34 to maintain it taut.

To minimize dropping of the motor in the event of a belt breaking there is shown an outwardly extending bar or angle member 30, secured by bolts 33 to a suitable connecting bracket intermediate the spaced uprights 25 and 26. In the event of belt breakage the motor and its platform may drop down and rest against the outwardly extending bar 30.

The fly wheel 32 may be connected with and disconnected from the crank shaft 31 by any suitable clutch mechanism. When the clutch mechanism 38 is so positioned as to operatively connect the fly wheel with the crank shaft 31, the latter will be rotated and when the clutch mechanism 38 is operatively disconnected, the crank shaft 31 may be at rest with respect to the rotating fly wheel 32.

Operating lever 40 pivotally supported adjacent one end thereof by a pin 41 may be connected with the clutch mechanism 38 through the intermediation of link member 43, bell crank 44, lever 46 and spring or other resilient means 47. As shown in Fig. 2 the normal tendency of the spring 47 is to maintain the clutch mechanism 38 disengaged with respect to the fly wheel 32 and crank shaft 31. The operating handle or lever 40 is shown connected with a plunger or rod 48 and the lower end of this rod 48 is operatively connected with a solenoid mechanism located within the receptacle or box 50. When current is being supplied to the motor 35 a solenoid within the receptacle 50 will be energized and the clutch mechanism 38 may be actuated to operatively connect the fly wheel 32 and crank shaft 31 by pressing downwardly on the free end of the lever 40; this serves to move a contact bar 52 (Fig. 9) into contact with the solenoid and the energized solenoid holds the contact bar in such position until the current is cut off or until the free end of the operating handle or lever 40 is moved upwardly. In this manner engagement and disengagement of the clutch mechanism 38, and operation of the crank shaft may be readily controlled.

Since rotation of the crank shaft controls reciprocation of the punch means 4, the punching operations effective upon a strip of material 7 may be readily controlled.

The crank shaft 31 is preferably provided with a suitable eccentric, "throw" or other offset portion 53 to which is connected a suitable bearing or collar 54 having a downwardly extending connecting portion 55 shown operatively connected with a shaft 56 and bearing or "crosshead" member 58. As the crank shaft 31 rotates, the eccentric or throw serves to reciprocate the rod 56 and crosshead 58. The latter portions may be restrained against undesirable movement by means of guide plates or bearing members 59 secured to the spaced uprights 25 and 26 by bolts 61.

Connected with the crosshead member 58, by means of a clamping block 64 and bolts 65 is a punch-plate-carrying member 67. The punch-plate-carrying member 67 is shown provided with apertures adjacent opposite ends thereof within which are fitted suitable bearings 68 adapted to slide to and fro along the spaced upright guide posts 70. The punch plate 19 with its punches may be bolted or otherwise to the underside of the carrying member 67; the co-operating guide bearing 68 and guide posts 70 serve to accurately guide the punches of the punch plate 19 upon reciprocation thereof due to rotation of the crankshaft 31.

The above described construction whereby the punch carrying member of guide member 67 has a shank or extension 69 secured with the crosshead 58 by the block 64 and bolts 65 facilitates construction of the machine and ready use of different size punches with the machine.

The punch plate 19 together with the punches is shown more particularly in Figs. 4 and 6 of the drawings. As shown in these two figures the punches are fitted into suitable apertures or openings which extend through the punch plate 19 and are provided with enlarged or countersunk portions 21 adjacent their upper ends adapted to receive enlarged portions at the ends of the punches.

As previously pointed out, the openings 2 of spangles are adapted to be formed or knocked out by the punches 16 of relatively small diameter and the spangles themselves or their exterior shapes are adapted to be formed by the larger punches 17 shown positioned adjacent the smaller punches. In the drawings there are shown fourteen small diameter "center" punches and fourteen larger spangle forming punches 17, the punches being arranged in two rows of seven punches each. The punches are disposed in what may be referred to for purposes of convenience as "sets"; that is, each of the seven punches 16 disposed in one extending transversely row across the punch plate 19 is adapted to co-operate with an adjacent spangle forming punch 17 positioned slightly to the rear of the center forming punch. A second row of such sets of punches is shown spaced rearwardly of the first row of said sets. Preferably the co-operating sets of small and large punches are offset or staggered with respect to each other in the two rows (Fig. 3) to thereby minimize wastage of strip material; this arrangement facilitates forming the spangles from closely adjacent portions of a length of material being fed through the machine.

The feeding mechanism, which will be hereinafter described in greater detail, is adapted to move or advance the strip of material 7 through the machine in step-by-step relationship with respect to the punches 16 and 17; the feeding mechanism advances the material 7 during the interval when the punches are elevated clear of the material and it preferably advances the strip a distance sufficient to position the center of the spangle opening 2 approximately beneath the center of the spangle forming punch 17.

The possibility of error in positioning of the center opening 2 with respect to the spangle 1 is minimized by positioning the center punches 16 and spangle forming punches 17 adjacent to each other as illustrated in Fig. 4, this effects only a relatively short movement of the strip in passing from the smaller to the larger punches. This is preferable to disposing the smaller punches in two adjacent rows and the larger punches in two adjacent rows behind the smaller punches as in such instance a strip must move through several steps prior to a center opening 2 of a spangle being disposed beneath the larger spangle forming punches 17; as a result slight errors in spacing of the punches in the punch plate or slight errors in connection with the advancing of the strip through the machine may be objectionably magnified.

While it will be brought out that the feeding mechanism may be closely adjusted to accurately control advance or movement of material through the machine beneath the punches, there are preferably provided a pair of spaced pilot punches 72 having tapered lower ends 73. The pilot punches 72 are shown slightly longer than the spangle forming punches 17 and hence project through previously formed spangle holes in the length of material prior to the spangle forming punches coming into contact with the length of material. In the event of misalignment or slight inaccuracy in connection with the advance of the strip material 7 through the machine the pilot punches 72 serve to shift the material slightly in the correct direction to insure accurate positioning of the material beneath the punches 16 and 17.

While the spangle forming punches 17 are shown having flat lower ends 74 it will be clear that they could have any suitable shape. For example, they could be as illustrated in Fig. 4a wherein there is shown a punch having a pattern with recessed or grooved portions to form spangles with impressed star shapes or the like.

In order to minimize or prevent objectionable upward movement of the strip of material during retraction of the punches from the strip, there is preferably provided a stripper plate 8. The stripper plate 8 extends over the length of material and is provided with openings therethrough for receiving the various punches. As the punches withdraw from the strip during upward movement the under surface of the stripper plate 8 serves to retain or hold the material downwardly; the stripper plate 8 thus strips the material from the punches during their upward movement. The stripper plate thus serves to provide a channel through which the material passes. While the stripper plate is shown in Fig. 6 as formed of a single piece of material, the downwardly extending leg portions shown at each side thereof may be formed of separate spacer elements.

In order to accurately form the center openings 2 and the spangles 1 it is desirable that the strip of material 7 be supported adjacent the openings to be formed therein by the various punches. This desirable supporting of the material may be provided by a die plate 5 shown positioned beneath the stripper plate 8 and having holes or openings therethrough correspondingly substantially to the sizes of the punches carried by the punch plate 19. As the punch plate and punches descend to form openings in the material the material is firmly supported adjacent the punches by the solid or imperforate portions of the die plate 5.

It will be noted (Fig. 4) that the openings in the die plate 19 adapted to receive the larger spangle forming punches 17 are provided with enlarged portions of counterbores 76; these are adapted to co-operate with means for receiving the spangles, which will be later described.

The small center pieces removed from the material 7 by the smaller punches 16 in the formation of the small "center" openings are adapted to be received in channels, grooves or recesses 14 shown formed in a bottom plate 15 disposed beneath and adjacent the die plate 5. As the punches descend the smaller center forming punches 16 push the small center slugs through the die plate 5 and into the channels or grooves 14 of the bottom plate 15. The groove 15 is shown in Fig. 3 of substantially U-shape with the long legs thereof extending beneath the respective rows of smaller punches 16. The end of one of the legs of the channel is shown connected with a port 78 of relatively small diameter and the other leg is shown connected with a conduit 80 by passageways 82 and 83 formed in the bottom plate 15 and supporting plates or "bolster" 85.

The conduit 80 may be connected with an air system in such manner as to provide for removal of small center slugs from the grooves 14 under the influence of suction or partial vacuum created in the grooves 14.

As shown in Fig. 6 the conduit 80 connects with a chamber-forming member 87 through which extends a nozzle member 88 having a discharge opening 89 at one end thereof. The nozzle-like member 88 is connected with a source of compressed air (not shown) by conduits 91, 92, valve means 94 and conduits 95, 96, and 97. When air from the source of supply is admitted into the conduits so as to emerge from the open end 89 of the nozzle 88 there is created in the chamber 86 of the member 87 a decrease in the pressure or a partial vacuum; this decreased pressure causes air in the grooves or recesses 14 and the connecting passageways 82 and 83 to rush therefrom into the chamber 90. As the air rushes or emerges from the grooves or recesses 14, air from the atmosphere tends to enter the groove 14 through the relatively smaller opening 78 in communication therewith. The rapid emergence of air from the recess 14 serves to carry along the small center slugs knocked or punched out of the strip of material by the center forming punches 16. Preferably an additional conduit 98 is connected with the chamber forming member 87 adjacent the lower part thereof and has the lower end thereof extending freely downwardly so that a cloth bag or receptacle 100 may be fitted over it in any suitable manner. Slugs carried out of the recesses 14 and into the chamber 86 are thus caused to pass through the conduit 98 and into the bag 100; the bag is preferably of some relatively loosely woven material which will retain the slugs and permit the ready dissipation of air which enters the bag from the conduit 98.

In some instances it may be desirable to subject the grooves or recesses 14 to air pressure so as to forcibly blow out material deposited by the punches 16. This may be readily achieved by connecting suitable conduits with opposite ends or other portions of the recess 14.

It is desirable that the small center slug be drawn or sucked out of the recesses 14 immediately subsequent to their disposition in the grooves 14 by the punches 16 and prior to withdrawal of these punches from the die plate 5. Withdrawing the slugs at such time and while the punches are still positioned within the openings of the die plate 5 provides efficient withdrawal of the slugs and minimizes drawing air from the atmosphere into the recesses 14 through the punch openings of the die plate. The recesses 14 may be subjected to intermittent or periodic suction or aspirating effect by suitably controlling the passage of air through the nozzle 88. A preferred form of mechanism for achieving intermittent actuation of the slug withdrawing means is illustrated in Fig. 1 wherein a valve 94 intermediate the conduits 95 and 92 may control passage of air therethrough. The valve 94 is shown adapted to be actuated by a cam 102 through the intermediation of a roller 103 carried on a movable arm 104. The cam 102, of any appropriate outline, is shown operatively connected with the crankshaft 31 so that rotation of the crankshaft 31 serves to rotate the cam 102. As the crankshaft 31 rotates, the cam 102 is caused to move into position to contact the roller 103 and open the valve 94. Since the same crankshaft 31 serves to reciprocate the punches, the cam 102 may be readily positioned to open the valve 94 upon or shortly after the commencement of upward movement of the punches 16 with respect to the die plate 5; the contour of the elevating and lowering portion of the cam 102 may be such as to cause closing of the valve mechanism 94 prior to complete withdrawal of the punches from the die plate 5. In this manner the air may be turned on to remove the small slugs from the recesses 14 only during the time interval that the punches 16 remain in the complementary openings of the die plate 5, and drawing of undesirable quantities of air through the openings of the die plate is minimized or prevented. The above described operation conserves compressed air and hence renders the machine efficient and less costly to operate. An air pressure gauge 99 may be used to indicate the particular pressure existing in the conduits 96 and 97.

It will be clear that the atmospheric opening 78 shown in the right leg of the recess 14 and the connecting passageways 82 and 83 shown in communication with the left leg of the recess 14 could be interchanged, if desired.

The material acted upon by the punches to form the spangles may initially be in the form of a roll of material 10, a length or strip passing from the roll 10 through the machine and onto a second roll 13 disposed adjacent the outlet side or rear of the machine. As pointed out hereinabove, the material moves in step-by-step manner through the machine beneath the punches at which point it is acted upon by the punches to form spangles.

Movement of the strip through the machine may be achieved by upper and lower rollers 107 and 108, respectively, shown in position adjacent the outlet side of the machine. The lower roller 108 may be mounted in fixed position and the upper roller 107 may be urged toward the lower roller by springs 109; the springs 109 press against a collar or bearing 110, through which an axle portion of the roller 107 extends, and rest at their opposite ends against the underside of a cap or cover member 111. This construction serves to yieldably urge the roller 107 toward the roller 108.

Insertion of a strip of material between the rollers 107, 108 may be facilitated by moving the upper roller 107 slightly away from the lower roller 108 to provide sufficient space for receiving the length of material. Movement of the upper roller 107 away from the lower roller may be assisted by an arm or lever member 114 shown extending forwardly from a bracket 116 and pivotally mounted at 117 on spaced uprights 119 bolted to the horizontally extending spaced frame members 23 and 24 of the machine. An arm or extension 122 of the bracket 116 projects beneath the axle portion of the upper roller 107 so that pressing downwardly on the free end of the rod 114 serves to move the bracket arm 122 upwardly to space the upper roller 107 away from the lower roller 108.

During operation of the machine the rollers 106 and 107 are actuated in such manner as to move or pull the strip of material through the machine. Actuation of the rollers may be achieved by the crankshaft 31 through the intermediation of a link or rod member 125 and clutch mechanism 126, a portion of which is connected with the lower roller 108 to drive or actuate the latter.

The clutch mechanism 126 shown is of the "one way" type in that it is adapted to effect rotation of the shaft 108 in only one direction, namely, so as to move the strip of material through the machine in only a forward direction. As illustrated more particularly in Figs. 7 and 8 the clutch mechanism comprises a substantially annular collar 128 which extends around a hub portion 129. The hub portion 129 is provided with a plurality of pockets or openings 131 having inclined bottom wall portions within which is positioned a roller 132 normally urged in one direction (here shown as clockwise) by springs or resilient means 134. A cover plate 139 may be utilized to retain the rollers or balls 132 and the resilient means 134 in position within the recesses 131. The hub portion 129 is shown secured to an extension 108a of the roller 108 by a set screw 136 so that it at all times rotates with the shaft 108.

As the crankshaft 131 rotates and carries with it the eccentric mounted on the upper end of the rod member 125, the lower end of the rod member is caused to reciprocate substantially lingitudinally. Since the lower end of the rod member is secured by a pin 137 with an extension 138 of the collar member 128, the collar member 128 is caused to rotate or oscillate about the center of the shaft extension 108a. When the rod member 125 moves the collar 128 in counterclockwise direction (Fig. 7) the rollers 132 shown positioned in the pockets or chambers 131 of the hub member 129 are wedged toward the narrow portion or portions of lesser depth of the pockets so that the rollers tend to wedge securely between the inner diameter of the collar member 128 and the shallow portion of the pockets 131; the rollers thus serve to securely and operatively connect together the collar and the shaft, and counterclockwise rotation of the collar effects corresponding rotation of the shaft extension 108a and roller 108 through a corresponding angular distance.

Upon movement of the lower end of the rod member 125 in an opposite direction the roller 128 is moved in clockwise direction and the tendency of the rollers or balls 132 is to move toward the portions of greater depths of the pockets or openings 131, thus serving to unlock or free the collar and hub portion 129. When the collar 128 is moved in clockwise direction the roller extension 108a and the roller 108 remain at rest. The clutch construction is effective to rotate the roller in only a single "forward" direction.

While the hub member 129 is shown with three equally spaced pockets or openings 131 it will be clear that a greater or lesser number could be used and also that they could be positioned closely adjacent each other at only one side of the hub member.

Undesirable movement of the lower roller 108 and its extension 108a is minimized or prevented entirely by the provision of a brake mechanism which serves to maintain the roller in position during intervals when it is not being acted upon by the collar 128 to move the roller in forward direction. The brake mechanism may comprise a plate or member bifurcated to form leg portions 140 and 141, the upper ends of the legs fitting closely about a portion of the hub member 129. The bifurcated member is shown pivotally mounted on one of the roller standards 119 by a pin 142 and the legs of the member normally urged yieldably toward each other and firmly into contact with the hub member 129 by a spring 144 extending around a rod or bolt 145 and retained thereby by an adjustable nut 146. The position of the nut may be varied along the shaft 145 to adjust the holding effect of the brake occasioned by the spring 144 against the hub 129.

The upper roller 107 may be driven by the lower roller through the intermediation of intermeshing gears 147 and 148 (Fig. 2) attached to the rollers adjacent their opposite ends from the brake mechanism shown in Figs. 7 and 8.

A "stroke" or length of movement of the collar 128 may be varied as adjusted, to obtain a desired material feed, by shifting the position of the upper end of the connecting rod 125. The upper end of the connecting rod is shown mounted, in any suitable manner, in a slot or opening 123 into which extends a threaded member 124. Rotation of the threaded member 124 serves to shift the position of the upper end of the connecting rod 125 along the slot 123 and to change the effective length thereof; the construction provides a variable eccentric connection of the rod 125. Varying the effective length of the rod 125 varies the distance through which the clutch mechanism moves a strip of material 7.

Material emerging from between the feed rollers 107 and 108 is formed into a roll 13 on a suitable drum pivotally mounted adjacent the outlet side of the machine. This drum is preferably driven or rotated by the roller shaft 108a, drive belt 150 and pulley 151. While any suitable belt 150 may be utilized it has been found that a relatively weak spring gives good results as it provides sufficient slippage or "give" for various diameters of the roll 13 during building up thereat from a small to a large diameter; this provides a more desirable feed of the material emerging from between the feed rollers 107 and 108.

In some instances the material being fed through and acted upon by the machine may be of warped, twisted or wrinkled nature which tends to feed unevenly or inaccurately through the machine. In these instances the control arm or rod 114 which serves to elevate the upper roller 107 may be so adjusted that its outer end projects beneath a portion of the punch plate or other convenient portion of the reciprocating punch mechanism. In this way downward movement of the punch and its mounting members may be caused to move the rod 114 and separate the upper roller 107 from the lower roller 108. By so adjusting the parts the rollers may be separated prior to the punches 16 and 17 striking the material and the pilot punches 72 may shift the freed or unlocked strip of material slightly so as to accurately position it with respect to the descending punches; thus greater accuracy may be provided in the forming of the various holes or spangles.

Correct feeding of a strip 7 through the machine is further enhanced by the mechanism illustrated more particularly in Figs. 3 and 4 of the drawings wherein the strip passes between spaced guide plates 153 and 154. One of the guide plates is provided with a notch or cut-out 155 through which projects a pin or member 156, the pin 156 being urged yieldably inwardly against the intermediate strip 7 by a spring or other resilient means 158. A screw 159 may be used to maintain the spring 158 in position within a groove 161 of the plate 154 and a screw 163 may retain the pin 156 in position thereon. The resiliently mounted pin 156 presses a strip of material 7 against the opposite side 153 of the guiding channel formed by the spaced members 153 and 154 to insure correct positioning of the strip prior to its feeding beneath the punch means 11. The strip may be held downwardly against the bed or plate 3 over which it passes, by a bail-like member 165 carrying a transversely positioned roller 166 thereon. Opposite ends of the bail-like member 165 project into suitable openings in the spaced guide members 153 and 154 and an inwardly extending pin 168 may serve to hold the bail-like member downwardly so that the roller 166 thereon presses the strip 7 firmly downwardly against the table 3 over which it passes.

The magazines or receivers which are adapted to receive the spangles punched out by the press are shown more particularly in Figs. 4, 5 and 6 of the drawings. As shown in these figures the magazine comprises a plurality of tubular members 170 positioned similarly to the punches 17 and to the openings 18 into which these punches press spangles. The correct spacing of the tubular receiving members 170 may be maintained by positioning members or plates 171 and 172 secured to the tubular members adjacent the upper and lower portions thereof.

The upper retaining or spacing plate 171 is adapted to support the rows of receiving or magazine tubes 170 in position beneath the die plate 5 and the bottom plate 15 and hence extends outwardly in position to be supported upon the upper edges of a substantially U-shaped holding member 173 having an inclined surface 175 adjacent the upper front corners thereof.

To place a magazine in position for receiving spangles formed by the punches, the magazine may be inserted within the opening 169 and pressed therethrough until positioning recesses 176 fit about positioning pins 177; the complementary recesses 176 and pins 177 serve to indicate when the magazine is correspondingly positioned beneath the enlarged or counterbored positions 76 of the die plate 5. With the magazine in this position it may be elevated so that the upper ends of the tubes 170 move into the counterbored opening 76 and the upper ends of the tubes 170 rest against the substantially flat bottomed or inwardly extending ledge portions of the counterbores 76. When in this relationship the holding member 173 may be pressed into the opening 169 so that the downwardly extending feet 179 slide along and rest against inwardly extending ledges 180 of the bolster 85. The inclined or curved upper front edges 175 of the holding member 173 slide beneath the magazine positioning member 171 and maintain it in upward position.

While the feet portions 179 of the holding member 173 may be formed integrally or rigidly with the holding member 173 they are preferably yieldably mounted in suitable openings and urged downwardly by springs 181 retained within recesses by screw plugs. This construction facilitates insertion of the holding member 173 and firm maintenance of the magazine in upward position within the counterbored portions of the die plate 5.

Improved operation of the present machine is achieved by providing each of the tubes 170 of a magazine with what may be termed a yieldable bottom. As shown in Figs. 4 and 5 this yieldable bottom comprises a hollow tubular member within each of the tubes 170, each of the interior telescoping tubes being provided with split or divided upper end portions and the upper end portions being spread or separated from each other in such manner as to press against the interior of the tubes 170. The frictional engagement thus provided between the inner members 183 and the tubes 170 facilitates movement of the inner members with respect to the outer tubes 170 and yet retains the inner telescoping tube in adjusted position. Preferably the inner telescoping tubes 183 are mounted adjacent their outer ends in a suitable retaining or holding plate 185.

Prior to insertion of a magazine in the machine the inner tubes are preferably pressed well within the outer tubes 170 so that the ends 184 of the inner members project above the outer members 170. When the magazine is moved or pressed upwardly so that the upper ends 186 come into contact with the shoulders or bottoms of the counterbores 76 the ends 184 of the inner members may, in some instances, actually project within the punch openings 9 of the die plate 5. That is, the end of the inner members may project beyond the ends of the outer tubes 170. As a punch descends to form a spangle an inner member 183 may move downwardly under the influence of punches or of intermediate formed spangles. In this manner spangles are pushed into the tubes 170 and do not readily become tilted or cocked to one side in such manner as to jam the spangles within the magazine. The inner telescoping members support the formed spangles substantially flatly in position and the inner members move downwardly step-by-step as newly formed spangles are inserted into the magazines.

While the preferred embodiment contemplates the extension of the tubular members 170 into the counterbore 76 of the die plate 5, it may be desired in some instances to extend the punch opening 9 into the bottom plate 15 and to provide a counterbore 76a only in the bottom plate instead of in the die plate 5. In such instances the insertion and operation of the magazine will be similar to that above described.

When a magazine has become filled with spangles it may be removed from the machine by withdrawing the holding member 173 and sliding the filled magazine outwardly through the opening 169 of the bolster 85. Formed spangles may be removed from the tubes 170 by inserting needles 188 through the center openings of the spangles, pressing the inner telescoping tubular members 183 into the tubes 170 to eject the needled spangles and subsequently threading the spangles by pulling a thread through the needled spangles by means of a hook-shaped portion 189 shown adjacent the end of each of the needles.

While the magazine may be of any suitable size it has been found that satisfactory results are obtained by providing a magazine of length sufficient to receive one thousand spangles. With a magazine having tubes 170 each of which is adapted to receive one thousand spangles there is provided a magazine having a total capacity of fourteen thousand spangles.

In order to insure stoppage of the machine upon filling a magazine with fourteen thousand spangles there is preferably utilized a counter mechanism 45 shown adjacent the upper portion of the machine in Figs. 1 and 2. The counter mechanism may be connected with a reciprocating portion of the machine by a link member 12 so that each descending stroke of the punch may register on the counter mechanism 45. With the example described above each down stroke of the punch results in the production of fourteen spangles. Any suitable type of commercial counter mechanism may be utilized and it has been found that one which is adjustable or settable to any desired number gives good results. In order to stop the operation of the machine upon reaching the predetermined or set value of the counter the latter is shown, in Fig. 9, operatively connected into the electrical circuit of a punch press. In Fig. 9 the counter is shown with a contact member 191 thereof disconnected from the electrical circuit and in this position the machine is not in operation. A normal position of the contact bar 191 is across and joining together the contact points 193 and 194.

When a main power line switch 196 of the machine is closed current may pass through the various leads to operate the motor 35 and continuously rotate the fly wheel 32. Engagement and disengagement of the fly wheel 32 with the crank shaft 31 is achieved by the operating lever 40 (Fig. 2) connected with a solenoid 48 and contact bar 52. When the contact bar 52 is pressed downwardly against the contacts 197 of the solenoid, the energization of the solenoid serves to maintain the motor 35 and flywheel 32 connected with the crank shaft 31 so as to rotate the latter. In this position the contact bar 191 of the counter 45 will be in position closing the contact points 193 and 194.

The compressed air supply which is controlled by the cam 102 and valve mechanism 94 to remove slugs from the recesses 14 of the bottom plate 5 is connected with a pressure gauge 99 and the normal position of the internal mechanism of this pressure gauge is such as to maintain in closed position an electrical switch mechanism 198.

If the main switch 196 is disconnected the motor 35 is disenergized and the press stops. If the operating lever 40 is moved up as to disengage the clutch mechanism 38 the solenoid plate 52 is disconnected from the solenoid contact 197; in this instance also the press stops. In the event the main switch 196 and the clutch mechanism 38 are each in closed or operative position and the press reaches the predetermined quantity set on the counter mechanism 45, the mechanism of the latter counter is such as to move the contact bar 191 away from the contact points 193 and 194 and stop the machine. In the event the counter mechanism does not reach its predetermined value and the contact points 193 and 194 are closed, and the supply of compressed air drops to an undesirable value, the internal mechanism of the pressure gauge 99 is such as to allow a resiliently mounted contact member 200 to move away from the contact point 201; in this instance also the machine stops. Hence it will be seen that the machine is largely automatically controlled in that it automatically comes to rest upon undesirable drop in air pressure, upon the machine producing a predetermined number of spangles, and upon disengagement of the clutch mechanism 38. It may also be stopped by disconnecting the main power line switch 196.

While the machine has been shown and described particularly with reference to punching spangles from a relatively narrow strip of material it will be understood that rolls of material having any desired or suitable width may be fed through the machine, and also that any suitable number of punches or arrangements thereof may be utilized. For example, the strips of material may be approximately twenty inches wide instead of approximately three and one-fourth inches wide as indicated generally in the present application.

In Fig. 10 there is illustrated one form of mounting for a plurality of rollers or material so that a plurality of strips may be fed through the machine simultaneously. While three rolls have been shown feeding through the machine in Fig. 10 any suitable number may be utilized, for example two or four.

The operation of the machine has been described in detail in connection with the description of the construction thereof; it is hence believed that a further detailed description of the operation at this point is unnecessary.

In some instances it may be desired to feed sheets of material through a punching machine instead of relatively long narrow strips. Such sheets may be of any size, for example, they may be twenty inches wide and fifty inches long. Where a strip of this width is to be fed through a punching machine of the class described it will be clear, as pointed out hereinabove, that any suitable number of punches may be utilized; with a strip twenty inches wide there may be utilized relatively long transversely extending rows of spangle punches similar to those already described hereinabove, the punches being so arranged as to extend across the entire width of the sheet of material.

To efficiently feed and punch such a sheet of material it is preferable to provide feeding means adjacent the front or entrance end of the machine, in addition to feeding means at the rear or discharge side of the machine. That is, in order to utilize a maximum area of the sheet for the formation of spangles it is preferable that a feed mechanism at the front of the machine be effective to initially advance the sheet of material into and beneath the punches, that the discharge punches later grip the sheet of material and act simultaneously with the entrance feed mechanism for moving the sheet beneath the punches, and that when the rearward end of the sheet has passed out of the entrance feed rollers the discharge or exit feed rollers continue to pull the sheet through the machine so that the punches may be effective upon it to the extreme end of the sheet.

The above referred to desirable feeding of a sheet of material, or of a strip of material, may be achieved by providing at the entrance end of the machine a feed mechanism similar to the feed rollers already described in connection with Figs. 1 through 10 of the drawings. This feed mechanism may be identical with the previously described feed mechanism and may be counted in any convenient position adjacent the front or entrance end of the machine. Such a "front feed" mechanism may be actuated (see Figs. 1 and 3) by utilizing a connecting pin 137 of increased length through the pivotal connection between the connecting arm 125 and the clutch actuating member 126, and connecting this extended pin with a rod or arm 142 extending along the side of the machine, this latter rod or arm to connect with a similar pin 138a of a feed mechanism 11a positioned adjacent the front end of the machine. Thus, as the connecting arm 125 serves to actuate the feed mechanism 11 through the collar 126 it likewise serves to oscillate or reciprocate the horizontally extending connecting arm 142 which is pivotally secured to the collar 126a of the feed mechanism 11a located at the front part of the machine; both feed mechanisms operate simultaneously and each serves to advance a strip or sheet of material by the same amount.

It will be clear that the feed mechanisms of either the discharge or entrance side of the spangle forming mechanism may be positioned at any suitable distances from the punch, the relatively closely adjacent position shown, for example, in Fig. 1 of the drawings being merely illustrative.

While the present machine has been described chiefly with reference to the formation of spangles it will be clear that it may be applied to the formation of other articles of similar general shape from sheets or strips of material.

It will be seen that the present invention provides a new and improved reciprocating or punch press which is adapted to form spangles at a relatively rapid rate and low cost. The machine is largely automatic in its operation requiring only the removal of filled magazines and insertion of fresh ones. Removal of center slugs or pieces forming attachment openings for spangles is achieved in a relatively simple, inexpensive and efficient manner. The magazines or receiving mechanisms for holding formed spangles or the like are constructed and operated in such manner as to minimize the possibility of jamming of spangles and consequent possibility of damage to the machine. The feature whereby wrinkled, twisted or warped materials may be accurately fed through the machine is most advantageous and results in the formation of more perfect spangles.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device adapted to be utilized for receiving spangles, comprising the combination of a plurality of hollow members, a mounting member secured to said hollow members adjacent normally upwardly disposed ends thereof and having outwardly extending supporting portions, a plurality of plunger-like apertured members substantially coextensive with and telescopically associated with said hollow members, portions of said plunger-like members normally frictionally and yieldably retaining said members in position, and a mounting member secured to said apertured members adjacent normally downwardly disposed ends thereof.

2. A device adapted to be utilized for receiving spangles formed by a punch press, comprising the combination of a hollow member open at opposite ends thereof and having imperforate walls throughout substantially its entire length, means connected with said hollow member and projecting laterally therefrom adapted to support it in position on said punch press, an apertured member at least as long as said hollow member extending into the hollow member and movable therealong in response to delivery of spangles by the punch press, and an outwardly projecting finger-like portion adjacent one end of said apertured member normally frictionally engaging the interior of said hollow member.

3. In a machine of the class described, the combination of a reciprocable punch, a die member adapted to cooperate with the punch in forming articles such as spangles, and means beneath said die member adapted to receive said articles, said receiving means comprising a plurality of hollow members, a mounting member secured to the hollow members adjacent upper portions thereof with a portion of the mounting member extending laterally from the hollow members, means for supporting said mounting member under said die member, a plurality of apertured plunger-like members substantially co-extensive with and extending into said hollow members, portions of said plunger-like members normally frictionally engaging the interior of said hollow members to yieldably retain the apertured members in position, and a mounting member secured to lower portions of said apertured members.

4. In a machine of the class described, the combination of a row of reciprocable punches and a die member with a row of apertures adapted to cooperate with the punches in forming perforations in a length of material, a member adjacent said die member having an imperforate surface spaced below and extending along discharge ends of the row of die apertures and forming a passageway along said apertures generally coextensive with said row thereof, one of said members having an inlet opening communicating with said passageway adjacent one end thereof and with the atmosphere, and one of said members having an outlet opening communicating with said passageway at a location spaced a substantial distance from said inlet opening, and means operatively connected with said outlet opening for drawing air through said inlet opening and along said passageway and through said outlet opening to thereby move punched out pieces of material away from said die apertures.

5. In a machine of the class described, the combination of a row of reciprocable punches and a die member with a row of apertures adapted to cooperate with the punches in forming perforations in a length of material, a member adjacent said die member having a surface spaced from and extending along discharge ends of the row of die apertures and forming a passageway along said apertures, one of said members having an inlet conduit opening communicating with said passageway and the inlet opening also communicating with the atmosphere, and one of said members having an outlet opening communicating with said passageway at a location spaced from said inlet opening, means operatively connected with said outlet opening for drawing air through said inlet opening and through said passageway to thereby move punched out pieces of material away from said die apertures, and additional means for controlling said air so as to draw it through said outlet opening only when the punches extend into said apertures.

6. In a machine of the class described, the combination of a plurality of rows of reciprocable punches and a die member with a plurality of rows of apertures adapted to cooperate with the punches in forming perforations in a length of material, a member adjacent said die member having a generally imperforate surface spaced from and extending beneath the rows of apertures and forming an elongated passageway along said rows, an inlet conduit communicating with said passageway and with the atmosphere, an outlet conduit connecting with said passageway at a location spaced a substantial distance along the passageway from said inlet conduit, and means operatively connected with said outlet conduit for drawing air through said inlet conduit and thence along said passageway generally transversely of said die apertures to thereby move punched out pieces of material away from said die apertures.

7. A device as claimed in claim 5, in which an electric motor is provided for reciprocating said punches, said means for drawing air through the passageway includes an air supply conduit adapted to carry an air stream for effecting in the passageway a different pressure than atmospheric pressure, and air-pressure-actuated switch means is provided exposed to air in said air supply conduit and connected electrically with the circuit of said motor for interrupting said electric circuit on excessive decrease in air pressure in the supply conduit.

JOSEPH G. POLK.

REFERENCES CITED

The following references are of record in the file of this patent:

UNITED STATES PATENTS

| Number | Name | Date |
|---|---|---|
| 381,716 | Murray | Apr. 24, 1888 |
| 492,342 | Tyler | Feb. 21, 1893 |
| 638,731 | Macrae | Dec. 12, 1899 |
| 764,851 | Hutchins | July 12, 1904 |
| 941,704 | Flynt | Nov. 30, 1909 |
| 1,283,661 | Carlson | Nov. 5, 1918 |
| 1,295,239 | Tyler | Feb. 25, 1919 |
| 1,351,264 | Schumacher | Aug. 31, 1920 |
| 1,552,648 | Rosenthal et al. | Sept. 8, 1925 |
| 1,610,600 | Bryant | Dec. 14, 1926 |
| 1,834,216 | Liljeberg | Dec. 1, 1931 |
| 1,881,868 | Nelson | Oct. 11, 1932 |
| 1,982,296 | Hall | Nov. 27, 1934 |
| 2,063,479 | Belluche | Dec. 8, 1936 |
| 2,168,284 | Crane et al. | Aug. 1, 1939 |
| 2,425,382 | Lubbert | Aug. 12, 1947 |